April 25, 1967  G. TRIULZI  3,315,315
DEVICE IN INJECTING AND MOLDING PRESSES
FOR HANDLING HEAVY ARTICLES
Filed March 2, 1964  4 Sheets-Sheet 4

INVENTOR
Giuseppe Triulzi

BY

Michael J. Striker
ATTORNEY

United States Patent Office 3,315,315
Patented Apr. 25, 1967

3,315,315
DEVICE IN INJECTING AND MOLDING PRESSES
FOR HANDLING HEAVY ARTICLES
Giuseppe Triulzi, Corso Sempione 52, Milan, Italy
Filed Mar. 2, 1964, Ser. No. 348,410
Claims priority, application Italy, Mar. 2, 1963,
4,415/63
11 Claims. (Cl. 18—30)

It is a known matter in injecting and molding presses that articles are handled or treated in order to provide them with insertions or coverings of metal, synthetic plastics, or rubber and the like.

When said articles are heavy they cannot be handled directly by the operators, but have to be displaced from one position to another by means of hoisting apparatus, such as elevators, cranes, winches or the like. In spite of these provisions, the handling of such articles is difficult, due to the necessity of placing every workpiece between the open molds of the press, to center it according to the operations which have to be carried out, all this on account of the existence of uprights, lower and upper press plates, and other obstacles. This difficulty is still increased by the use of such molds usually composed of two or more pieces, in particular of two side parts to embrace the workpiece, a bottom laying on the lower press plate, and an upper mobile plate acting as cover of the mold, all this being onerous, and causing a loss of time because of the necessity of centering and adjusting these several mold parts and article.

The device subject matter of this invention allows to handle the articles to be manufactured quickly; further, said device can be used either on horizontal or vertical presses for injecting or molding molten materials.

One embodiment of the invention comprises a sufficient strong seesaw, support mounted by its middle part on the press, so as to rotate thereabout, and comprising two like but opposed arms disposed so that when one arm is introduced between the press plates, the other arm is located outwards of the press. Each arm carries a pair of side parts of the mold; these parts are shaped in the same manner and correspond to the shape of the aritcle or workpiece to be treated; further each arm comprises means to control said mold parts to embrace in the right position the workpiece to be treated on the press. Thus when an article is under treatment, being held by one arm of the support between the press members, the previously treated article at the other arm, now rotated of the press to an unloading position, is discharged from the mold, by opening its side mold parts so that said article is released and can be withdrawn from the side mold parts. All these operations are carried out without any difficulty, with easiness and rapidity, thus also considerably increasing the production of the machine. As a matter of fact, setting up the workpiece, embracing it by the side parts of the mold held by the arm of the support and closing the mold on top and bottom by mold parts on the press members are effected as the other arm of the support is situated outside the press, where the operations can be made without difficulty and without the usual obstacles such as the uprights, lower and upper press plates, and the like means of a molding press.

The object of this invention further allows the fulfillment of combined operations of the introduction of articles to be treated in the press, and of extraction of the same in a different sequence for different treatments on the same articles, thus still increasing the utility of the invention's device.

Such a handling is not possible with the conventional vertical or horizontal injecting and molding presses known in the art.

The features of the invention will be more evident from the reading of the following description of its subject matter, in reference to the attached drawings showing a not limiting example of embodiment of a press arrangement device for handling heavy and/or bulky articles on a vertical injection molding press used for the casting of metallic inserts into electric motor rotors.

Figures 1, 2:
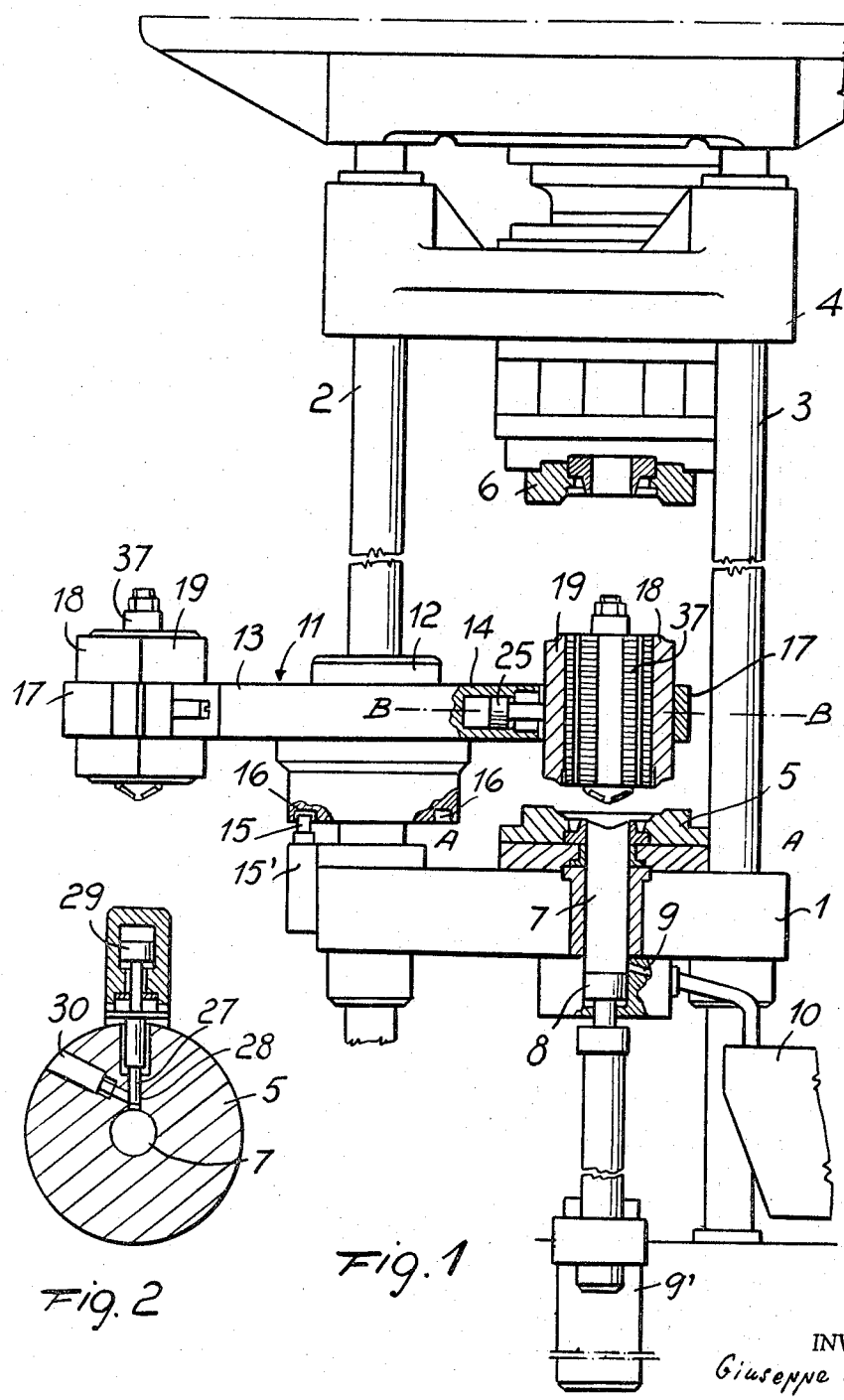
FIGURE 1 is an elevation, partly in section, illustrating an injection press equipped with the apparatus of the invention.
FIGURE 2 is a cross-section on line A—A in FIGURE 1.

Referring to FIGURE 1, the fixed plate 1 of the press and the mobile upper plate 2 of said press are set up on uprights 2 and 3. The fixed plate 1 bears the bottom part 5 of the mold, while the mobile upper plate sustains the top part 6 of said mold, both lower and upper parts 5 and 6 respectively being exactly centered on one another.

Centrally disposed in the mold part 5, and extending vertically downwards a cylindrical cavity is disposed with the purpose to provide molten metal, and within which a ram 8 moved by a hydraulic system 9' is located. In the position of the upper dead center, as shown in FIGURE 1, the ram 8 opens an aperture 9 of a conduit which ensures the communication between said cavity 7 and the molten metal container 10. Thus, with said ram 8 in the position shown in FIGURE 1, the molten metal can raise within said cylindrical cavity 7, when a negative pressure is provoked therein by the action of a pin 27 which slides within a bore 28 under the action of a hydraulic piston 29. The backwards movement of this small piston opens a hole and ensures the communication with a conduit 30 connected in turn with a vacuum pump, by which suction is obtained, thus causing raising of molten metal from said container 10 into said cylindrical cavity 7.

On one of the press uprights, f.i. on that numbered 2, an oscillating double-armed support 11 is disposed; which has a central sleeve 12 by means of which it can be rotated about said upright 2, preferably without any play, and two opposed arms 13 and 14 of same length. Support 11 can take angular positions of 180° or 90°, as hereinunder explained. In any case, each rotating movement of support 11, in particular with the purpose to center the lateral mold means 18, 19 in order to place it coaxially with the lower and upper mold parts 5 and 6 respectively, is determined by a pin 15 actuated by a hydraulic motor 15', and provided for entering blind holes 16 distributed on the periphery of sleeve 12, when each one of said blind holes is put in alignment with pin 15 and in correspondence with the required angle of rotation of support 11. Of course, in order to permit successive changes of the angular position of support 11, motor 15' will be operated so that pin 15 can be removed from that hole wherein it had been engaged.

Figure 3:
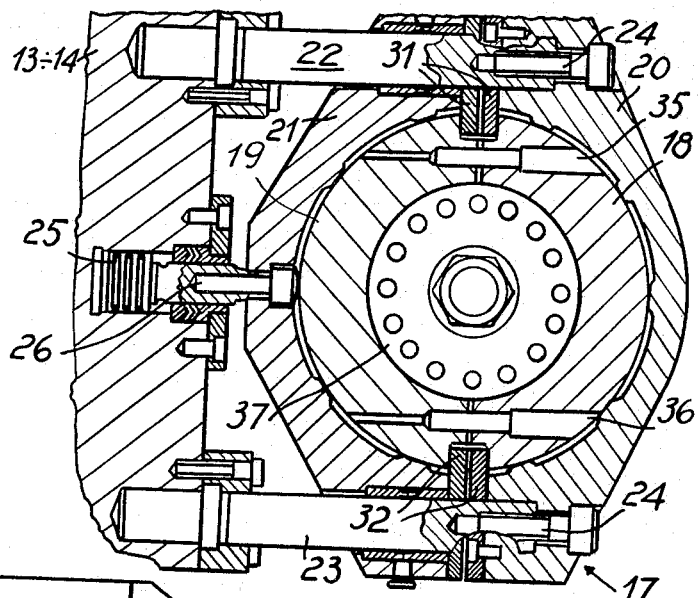
FIGURE 3 is a cross-section along line B—B of FIGURE 1.
Figure 4:
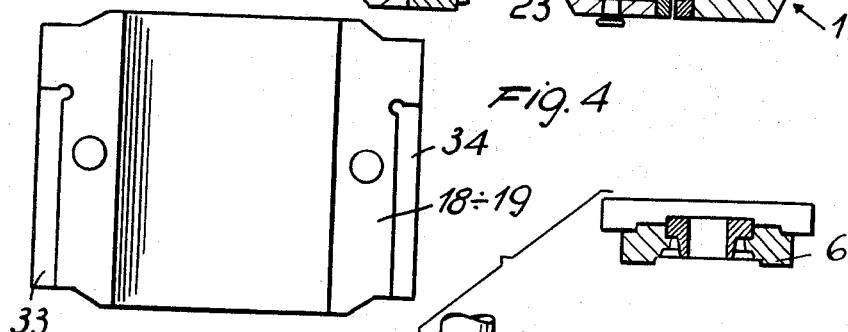
FIGURE 4 is a front view of one of the side parts of the mold.

Each support arm 13, 14, respectively, bears a divided clamping ring 17 (FIGURES 1 and 3) with the purpose of supporting and clamping the mold side parts 18 and 19 (FIGURES 1 and 4). Ring 17 is made of two clamping ring-halves 20 and 21, which are supported by two parallel shafts 22 and 23 coupled together and supported at each end of support 11, more precisely at the extremities of the arms 13 and 14. Ring halves 20 are fixed at the extremity of both arms 22 and 23 by means of screws. Ring halves 21, on the contrary, are slidable along said arms 23 and 22 due to the action of a double acting piston 25, disposed at the end of each arm 13 and 14, hydraulically moved therein, so that ring half 21 can be pressed against ring half 20, or separated from it. The double action of joining and separating of the ring halves permitted by piston 25 is possible because of a pin 26 connecting said piston ring half 21.

Both ring halves 20 and 21 pressed together hold and clamp pairs of mold side parts 18 and 19, and suspend them when separated. To this end, ring halves 20 and 21 bear along their confronting faces pairs of pins 31 and 32 entering grooves 33 and 34 situated at the facing edges of the mold parts 18 and 19. Said grooves begin from the lower edge of the mold and end at a point beyond the middle line of the mold, for which, when the ring halves 20 and 21 are separated each other, the mold side parts 18 and 19 can slide downwards by gravity and stop in the position wherein pins or projections 31 and 32 engage with the upper edge of said grooves. Consequently, mold parts 18 and 19 may assume a lowered position, wherein ring 17, 20, 21 embraces them over the horizontal middle position line, or an elevated position, wherein said ring holds them together about the same horizontal middle plane. To prevent that during said movements mold parts 18 and 19 slide on each other, two pins 35 and 36 are provided, the purpose of which being to exactly maintain said parts 18 and 19 of the mold at the same level, under the condition to not hinder their movement of joining together and separating, when necessary.

The mold side parts 18 and 19 are used to hold the article or workpiece to be treated, f.i. as in the illustrated embodiment, the rotor of electric motor 37.

Figure 5:
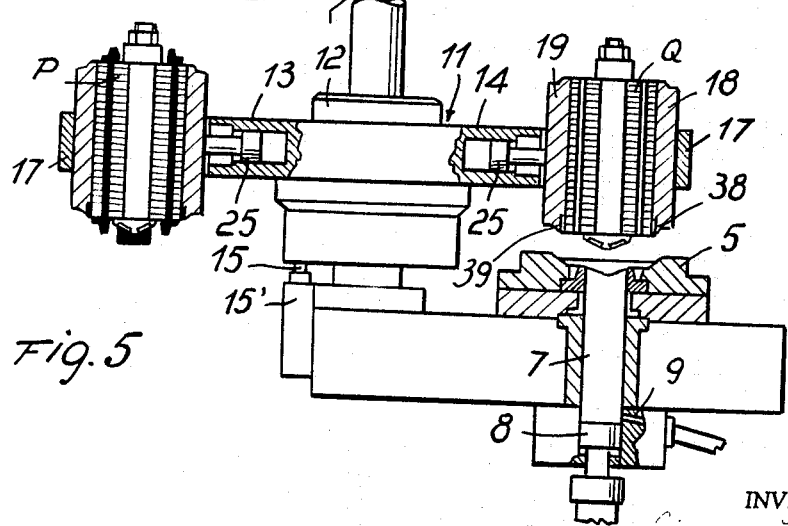
FIGURES 5, 6, 7, 8 and 9 show successive steps of operations of the apparatus illustrated in FIGURE 1.
Figure 6:
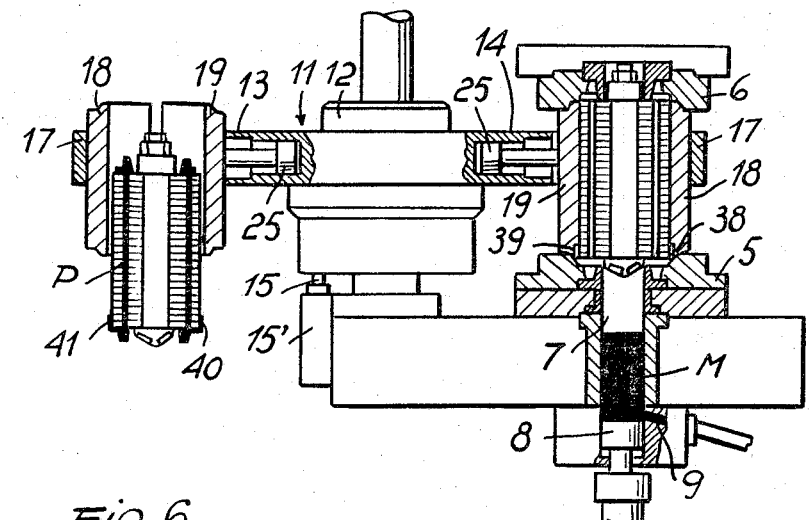
Figure 7:
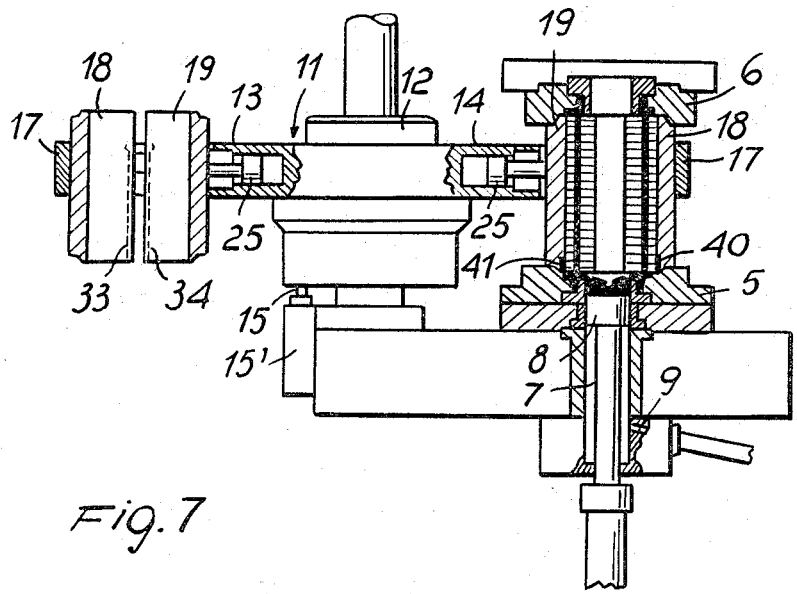
Figure 8:
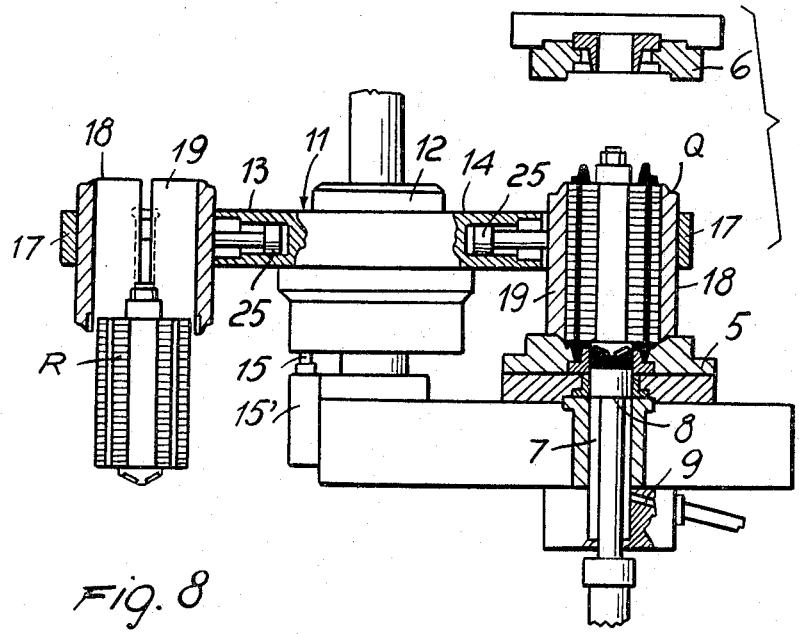
Figure 9:
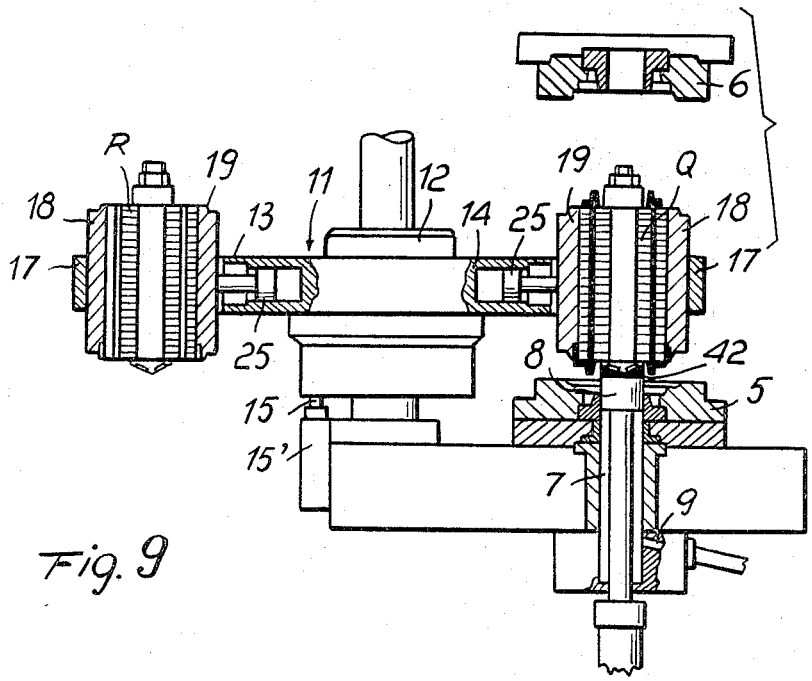

The working steps of the device are illustrated in FIGURES 5 through 9. In FIGURE 5, the support 11 is supposed just rotated so that arm 13 has brought a treated workpiece P shown to be a rotor of an electric motor to an unloading position external of the press, while a workpiece Q, still to be treated, has been moved into the press, to an operative position between the press mold parts 5 and 6. In this position, pin 15, actuated by the motor 15', has entered the holes 16 with it aligned, thus arresting support 11 so that the respective pair of workpieces Q to be treated and the side parts mold 18 and 19 are exactly centered in respect to the lower and upper mold parts 5 and 6, respectively.

Now, both pistons 25 are actuated (FIGURE 5), thus opening the ring 17 and halves 20, 21, and further permitting mold side parts 18 and 19 (FIGURE 6) to drop to their lowest position and to that of ring 17. In this manner, mold side parts 18 and 19 will rest on the adapted portion of the lower mold part 5, whereupon mold part 6 is lowered in turn. This movement wholly closes the mold 5, 6, 18, 19. Both the lateral parts 18, 19 of the mold are held in place and fastened therein by means of the upper and lower conical couplings provided for the mold parts 5 and 6. Still referring to FIGURE 6, since ring 17, 20, 21 of the arm 13 opened, both mold halves 18 and 19 are lowered, and opened, thus permitting the respective workpiece P to be extracted from the mold. Still in the case of FIGURE 2, piston 29 is actuated and it moves in turn the pin 27, which opens the communication between the cylindrical cavity 7 and the vacuum pump through conduit 30, so that the molten metal M can be sucked into said cavity. Of course, the quantity of molten metal can be dosed, as required, f.i. by controlling adequately said stroke of piston 29 by means of a timing instrument.

The cylindrical cavity having been filled with molten metal, (FIGURE 7), piston 8 is actuated so as to push the molten metal into the mold, to enter all cavities therein. Among these cavities, two, namely cavities 38 and 39 (FIGURES 5 and 6), are provided at the base portion of the side mold parts 18 and 19, wherein cast projections are formed during the phase of injection in order to provide means to facilitate the extraction of the workpiece after its treatment, by displacing it upwardly.

After the injection step is terminated (FIGURE 8) the press is opened and mold part 6 is raised, the pistons 25 being still in their retracted position, with the rings opened. In the meantime a new workpiece R can be placed in the side mold parts 18, 19 of arm 13 which is in the loading and unloading position.

The opening operation having been effected (FIGURE 5) piston 8 receives a further motion in vertical direction so as to raise together the treated workpiece Q, and the mold parts 18 and 19, in such manner that the lower parts of the treated workpiece, together with an overflow of metal 42, are brought above the plane of the lower part 5 of the mold.

At this point, raising of the workpiece R between the lateral mold parts 18 and 19 by the same means which raises said workpiece R is also terminated. The jacks 25 are newly actuated, so as to clamp strongly the rings 17, also strongly clamping on one side the workpiece Q, already treated and raised and, on the other side, the workpiece R. Thus support 11 can make another rotation of 180° in order to reach the position of FIGURE 5, and arm 14 will be brought to the position occupied before by the arm 13, and vice versa. Thus the workpiece Q will be brought to the outer unloading position, while workpiece R will take operative the position of the former workpiece Q, having thus changed the respective positions. Thus a successive cycle of operations takes place, as hereabove described. Of course, this angular movement of support 11 arm can take place only when the arresting pin 15 is disengaged from the corresponding hole 16.

Oscillation of support 11, can be effected by hand or by means of an electric motor or engine. Rotations of 180° are usually preferred because of the fact that the injection step of the molten metal into the mold is preceded by a suction phase in the mold, as indicated in the preceding example. There is also the possibility of submitting support 11 to oscillations of only 90°, particularly in cases in which filling of the mold is made by hand, so that a stationing of mold in the intermediate position of also 90° should be sufficient to free the mold itself, thus leaving for the operator the necessary space for filling of the mold.

According to another embodiment of the invention, instead of providing the side parts of the mold, which slide within the mentioned clamping rings 17, 20, 21 for the movements of lowering and lifting of the molds, a support 11 may be used, which slides up and down along the upright 2 of the press, using for this vertical movement of the support 11 the jack 15'. The fundamental operations will not change from those hereabove described with reference to FIGURES 5 through 9 of the drawing.

The invention, however, can be submitted to further changes and modifications, as skilled in the art will easily understand, in example for particular applications in the practical embodiment, within the bounds of the limit granted by the Letters Patent based on the following claims.

What I claim is:

1. Molding press arrangement, comprising, in combination, a press having two press members, at least one of which is movable toward and away from the other; first and second mold parts respectively mounted on said press members; a mold means; means mounting said mold means for movement between a loading and unloading position in which a workpiece is placed within, or removed from said mold means, and an operative position in which said mold means and workpiece are located between said first and second mold parts while the same are spaced from each other; means for moving said one press member toward the other press member so that said first and second mold parts are pressed against said mold means in said operative position to form with the same a mold enveloping said workpiece; and means for casting a molten material into said mold whereby a body is cast and connected with said workpiece whereupon said mold means is moved to said loading and unloading position for removal of the workpiece with said cast body and for insertion of another workpiece into said mold means.

2. A molding press arrangement according to claim 1 and including a support mounted on said press for turning movement about an axis and having a pair of diametrical arms; and wherein said mold means include two mold means respectively mounted on the extremities of said arms and being arranged and constructed so that said two mold means are alternately in said loading and unloading position and in said operative position.

3. A molding press arrangement according to claim 1 wherein said mold means includes a pair of third and fourth mold parts having frusto-conical ends; and wherein said first and second mold parts have frusto-conical faces for engaging said frusto-conical ends.

4. A molding press arrangement according to claim 1 wherein said one press member is movable in vertical direction; wherein said first and second mold parts are located above and below said third and fourth mold parts in said operative position; and including a support for said mold means turnable about a vertical axis.

5. Molding press arrangement, comprising, in combination, a press having a stationary press member, and a press member movable in one direction; first and second mold parts respectively mounted on said press members; a turnable support mounted on said press and having an axis parallel to said direction; at least two pairs of third and fourth mold parts mounted on said support angularly spaced from each other; means mounting said support for turning movement between a first position in which one of said pairs of third and fourth mold parts is in a loading and unloading position in which a workpiece is placed within, or removed from said one pair, and the other pair is in an operative position located between said first and second mold parts while the same are spaced from each other, and a second position in which said one pair is in said operative position and the other pair is in said loading and said unloading position; means for moving said movable press member toward said stationary press member so that said first and second mold parts are pressed against said third and fourth mold parts which are in said operative position, and form with the same a mold enveloping said workpiece; and means for casting molten material into said mold whereby a body is cast and connected with said workpiece while the respective other pair of third and fourth mold parts is in said loading and unloading position, whereupon said support is turned so that said workpiece with said cast body is moved to said loading and unloading position for removal and replacement of the workpiece while said respective other pair of third and fourth mold parts is placed in said operative position.

6. A molding press arrangement according to claim 5 wherein said movable press member is disposed above said stationary press member and is movable in vertical direction toward and away from the same; wherein said turnable support is turnable about a vertical axis and has two diametrically disposed arms; wherein said pairs of third and fourth mold parts are respectively mounted at the ends of said arms; and wherein said first and second mold parts are the top and bottom parts, and the respective pair of third and fourth mold parts are the side parts of said mold.

7. A molding press arrangement according to claim 5 and including clamping means for clamping each of said pairs of third and fourth mold parts; and motor means for operating said clamping means to clamp said third and fourth mold parts during movement between said positions of the same, and for releasing the same for unloading and loading of the workpiece, and for cooperation in said operative position with said first and second mold parts.

8. A molding press arrangement according to claim 7 wherein each of said clamping means includes a pair of ring halves embracing said pairs of third and fourth mold parts, respectively; and wherein each motor includes a hydraulic piston engaging one of said ring halves and urging the same against a respective other ring half, said ring halves being slidably mounted on said support, and said other ring half abutting said support when said third and fourth mold parts are clamped between said ring halves.

9. A molding press arrangement according to claim 8 wherein said first and second mold parts are disposed above and below said third and fourth mold parts in said operative position; wherein said third and fourth mold parts in said operative position are vertically extending side parts of said mold; wherein said third and fourth mold parts are mounted for vertical sliding movement in said ring halves and adapted to drop to a lower position when said ring halves do not clamp the respective third and fourth mold parts whereby said third and fourth mold parts engage said second mold parts; and wherein said first mold part is moved by said movable press member to engage the top end of said third and fourth mold parts.

10. Molding press arrangement according to claim 8 and including means for mounting said support for vertical movement with said third and fourth mold parts and ring halves for placing said third and fourth mold parts in said operative position in a position engaging said first mold part on said stationary press member.

11. A molding press arrangement according to claim 5 and wherein said casting means are mounted on said stationary press member communicating with said second mold part and including means for evacuating said mold and for pressing molten metal into said mold.

References Cited by the Examiner

UNITED STATES PATENTS

| | | | |
|---|---|---|---|
| 1,555,285 | 9/1925 | Hoey | 22—67 |
| 2,265,333 | 12/1941 | Wry | 22—68 |
| 2,676,368 | 4/1954 | Heiden et al. | 18—20 X |
| 2,807,844 | 10/1957 | Hemphill | 22—58 |
| 2,882,553 | 4/1959 | Cahill et al. | 18—5 |
| 3,122,800 | 3/1964 | Naffziger | 22—77 |

FOREIGN PATENTS

| | | |
|---|---|---|
| 186,415 | 8/1956 | Austria. |
| 849,974 | 8/1939 | France. |
| 852,070 | 10/1939 | France. |
| 832,698 | 4/1960 | Great Britain. |

J. SPENCER OVERHOLSER, *Primary Examiner.*

W. L. McBAY, *Assistant Examiner.*